United States Patent
Song

(10) Patent No.: US 9,329,818 B2
(45) Date of Patent: May 3, 2016

(54) IMAGE FORMING DEVICE TO USE TEMPORARY ACCOUNT, IMAGE FORMING SYSTEM HAVING THE SAME, AND METHODS THEREOF

(71) Applicant: Samsung Electronics Co., Ltd., Suwon-si (KR)

(72) Inventor: Woo-yeal Song, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/605,427

(22) Filed: Jan. 26, 2015

(65) Prior Publication Data

US 2015/0212770 A1    Jul. 30, 2015

(30) Foreign Application Priority Data

Jan. 28, 2014 (KR) .................. 10-2014-0010195

(51) Int. Cl.
*G06F 15/00* (2006.01)
*G06F 3/12* (2006.01)
*G06K 1/00* (2006.01)

(52) U.S. Cl.
CPC ............ *G06F 3/1238* (2013.01); *G06F 3/1222* (2013.01); *G06F 3/1273* (2013.01); *G06F 3/1292* (2013.01)

(58) Field of Classification Search
USPC .................................. 358/1.1–1.18
See application file for complete search history.

(56) References Cited

U.S. PATENT DOCUMENTS

| 7,860,533 | B2 | 12/2010 | Silverbrook et al. | |
|---|---|---|---|---|
| 8,229,847 | B2* | 7/2012 | McKernan et al. | 705/39 |
| 9,117,210 | B2* | 8/2015 | Cardina et al. | |
| 2009/0276341 | A1* | 11/2009 | McMahan et al. | 705/30 |

FOREIGN PATENT DOCUMENTS

JP    2012252455 A  * 12/2012

\* cited by examiner

*Primary Examiner* — Douglas Tran
(74) *Attorney, Agent, or Firm* — Staas & Halsey LLP

(57) ABSTRACT

An image forming device includes a communicator which performs communication with a user terminal apparatus, user account database (DB), a controller which creates a temporary account regarding the user terminal apparatus and registers the account on the user account DB, and an image former which performs the image forming job in response to a request for an image forming job received from the user terminal apparatus while the temporary account is valid, in which the controller records job performing results information on the temporary account in response to the image forming job being performed, and inactivate the temporary account when an inactivating condition is met.

20 Claims, 17 Drawing Sheets

FIG. 11

```
12345678
45678
1*345*78
45678_GalaxyS4
GalaxyS4_4W56
12*45*7_GalaxyS4_4W56
......
```

FIG. 12

| | |
|---|---|
| Account | ~1210 |
| BYOD Info | ~1220 |
| Created Date&Time | ~1230 |
| Life Cycle | ~1240 |
| Usage Info | ~1250 |
| Billed | ~1260 |

FIG. 13

| Job Type | A3(C/M) | | A4(C/M) | |
|---|---|---|---|---|
| Scan to USB | 0 | 0 | 1 | 0 |
| Scan to Cloud | 0 | 0 | 0 | 0 |
| Scan to BYOD | 0 | 0 | 0 | 0 |
| Copy | 0 | 0 | 0 | 1 |
| Print From USB | 0 | 0 | 0 | 6 |
| Print From Cloud | 0 | 0 | 0 | 0 |
| Print From BYOD | 4 | 0 | 31 | 0 |
| Send Fax | 0 | 0 | 0 | 0 |
| Receive and Print Fax | 0 | 0 | 0 | 0 |

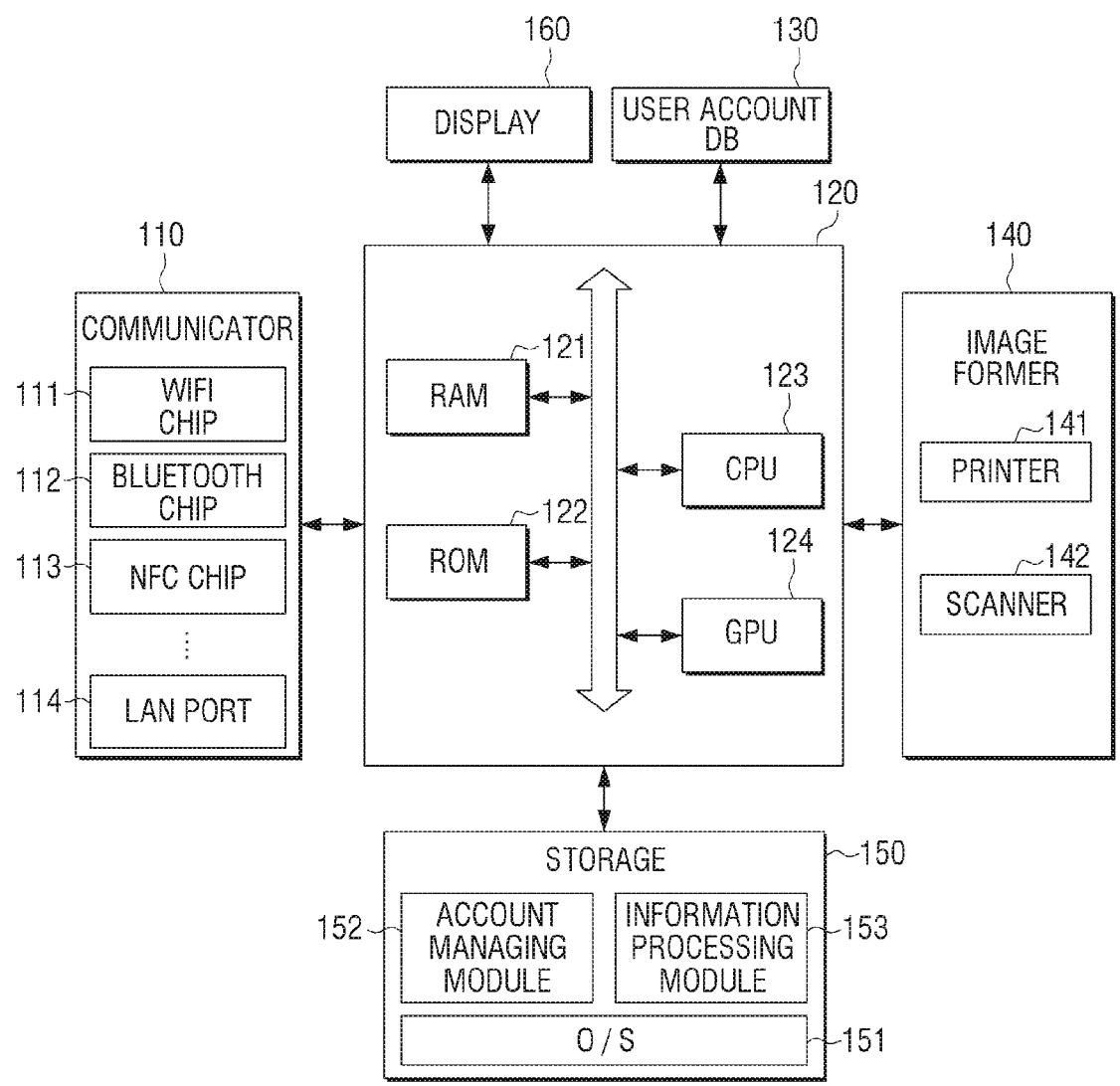

IMAGE FORMING DEVICE TO USE TEMPORARY ACCOUNT, IMAGE FORMING SYSTEM HAVING THE SAME, AND METHODS THEREOF

CROSS-REFERENCE TO RELATED APPLICATIONS

This application claims priority under 35 U.S.C. §119 from Korean Patent Application No. 10-2014-0010195, filed on Jan. 28, 2014 in the Korean Intellectual Property Office, the disclosure of which is incorporated herein by reference in its entirety.

BACKGROUND OF THE INVENTION

1. Field of the Invention

Devices and methods consistent with what is disclosed herein relate to an image forming device to use a temporary account, an image forming system including the image forming device, and methods thereof, and more specifically, to an image forming device configured to perform a job by using a temporary account, an image forming system having the same, and methods thereof.

2. Description of the Related Art

Various types of electronic devices are developed and supplied by the development or electronic technology. Specifically, various image forming devices such as printers, scanners, multi-function units, copy machines, or fax machines are distributed and used at home as well as office environment like offices, schools or research institutes. Further, image forming devices are established at public environment where people may share the devices located at community centers, convenient stores, metro stations, airports, or meeting rooms.

In response to a job performing request inputted by a user, the image forming devices can perform various image forming jobs such as scanning, printing, copying, or fax transmission. When printing is performed, a user may select a document in a host device connected to the image forming devices and input a printing command.

However, image forming devices that a plurality of users can voluntarily use may have a security problem. For example, when people use a common account such as a guest or public account, a history regarding usage records of a user can be viewed by other persons. Further, when scanning or printing documents is performed, relevant materials may be stored within a storing medium of the image forming devices. In this situation, when a user exits the job without deleting the materials, corresponding materials can be viewed or printed by another person without authorization. Thus, there may be inconvenience because a user should manually create his account in each job, and delete the account after being used in order to prevent the above-described problems.

Further, because there is one common account to be used, there may be a problem in having a difficulty to confirm which function is used by which user and how much the function is used. Thus, a managing person of the image forming devices directly counts each printing material, and collects a payment according to the number of printing pages, for example. In this case, when the person is out of the managing or away from the devices, a user should wait for the managing person while the user cannot use the image forming devices, or the payment may be made when a user uses the image forming devices and goes out or away from the devices without a notice or payment.

Thus, requested is new technology enhancing the security and the user convenience in an image forming system which a plurality of users can use.

SUMMARY OF THE INVENTION

The present general inventive concept provides an image forming device configured to perform a job by using a temporary account, and an image forming system including the image forming device, and a job performing method thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an image forming device, which may include a communicator configured to perform communication with a user terminal apparatus, a user account database (DB), a controller configured to create a temporary account regarding the user terminal apparatus and to register the account on the user account DB, in response to the communication performed with the user terminal apparatus, and an image former configured to perform the image forming job in response to a request for an image forming job received form the user terminal apparatus while the temporary account is valid. The controller may record job performing results information on the temporary account in response to the image forming job being performed, and inactivate the temporary account when inactivating conditions of the temporary account are met.

The controller may delete the temporary account from the user account DB in response to billing regarding the temporary account.

The controller may transmit the job performing results information recorded on the temporary account to the billing device in response to a request for information regarding the temporary account received from a billing device.

The communicator may collect device information regarding the user terminal apparatus by performing the nearfield wireless communication in response to approaching to the image forming device by the user terminal apparatus, and the controller may create the temporary account by using the device information.

The image forming device may additionally include a display configured to display a user interface (UI) establishing the temporary account in response to the nearfield wireless communication performed with the user terminal apparatus. The controller may establish inactivating conditions regarding the temporary account according to user setting inputted from the above UI. The UI may include at least one of a first menu for determining the inactivating conditions according to user setting, and a second menu for establishing functions provided to the temporary account. The inactivating conditions may include at least one among a valid time period of the temporary account, a number of jobs that can be performed by using the temporary account, and a number of pages that can be printed by using the temporary account.

The communicator may provide source information which provides an application to interoperate with the image forming device to the user terminal apparatus by performing the nearfield wireless communication, in response to approaching to the image forming device by the user terminal apparatus.

The controller may inform a user that the job cannot be performed in response to a request for an image forming job received from the user terminal apparatus while the temporary account is inactivated.

The foregoing and/or other features and utilities of the present general inventive concept may also be achieved by providing a job performing method of an image forming device, the job performing method including creating a temporary account regarding a user terminal apparatus in response to communication with the user terminal apparatus, registering the temporary account on a user account database (DB), performing the image forming job in response to a request for an image forming job received from the user terminal apparatus while the temporary account is valid, recording job performing results information on the temporary account in response to the image forming job, and inactivating the temporary account, when inactivating conditions of the temporary account are met.

The job performing method may additionally include deleting the temporary account from the user account DB in response to billing regarding the temporary account.

The job performing method may additionally include transmitting the job performing results information recorded on the temporary account to the billing device in response to a request for information regarding the temporary account received from a billing device.

The creating a temporary account may include collecting device information regarding the user terminal apparatus by performing the nearfield wireless communication in response to approaching to the image forming device by the user terminal apparatus, and creating the temporary account by using the device information.

The job performing method may additionally include displaying a user interface (UI) for establishing the temporary account in response to the nearfield wireless communication with the user terminal apparatus, and establishing the inactivating conditions according to options inputted from the above UI. The UI may include at least one of a first menu for determining the inactivating conditions according to user setting, and a second menu for establishing functions provided to the temporary account. The inactivating conditions may include at least one among a valid time period of the temporary account, a number of jobs that can be performed by using the temporary account, and a number of pages that can be printed by using the temporary account.

The job performing method may additionally include providing source information which provides an application to interoperate with the image forming device to the user terminal apparatus by performing the nearfield wireless communication, in response to approaching to the image forming device by the user terminal apparatus.

The job performing method may additionally include informing a user that the job cannot be performed in response to a request for an image forming job received from the user terminal apparatus while the temporary account is inactivated.

The foregoing and/or other features and utilities of the present general inventive concept may also be achieved by providing an image forming system which may include a user terminal apparatus, and an image forming device. The image forming device may create and store a temporary account regarding the user terminal apparatus in response to tagging of the user terminal apparatus, may perform the image forming job in response to a request for an image forming job received from the user terminal apparatus while the temporary account is valid, and may inactivate the temporary account when inactivating conditions of the temporary account are met.

The image forming system may additionally include a billing device configured to receive job performing results information regarding the temporary account from the image forming device in response to tagging of the user terminal apparatus, perform the billing regarding the temporary account based on the job performing results information and preset billing information, and respectively transmit billing information to the image forming device and the user terminal apparatus. The user terminal apparatus and the image forming device may respectively delete the temporary account in response to reception of the billing information.

The user terminal apparatus may receive source information for providing an application to interoperate with the image forming device in response to tagging of the image forming device, may access a source device corresponding to the source information to download, install and implement the application, and transmit device information of the user terminal apparatus to the image forming device according to implementing of the application, and the image forming device may create the temporary account by using the device information.

The image forming device may display a user interface (UI) for establishing the temporary account in response to tagging of the user terminal apparatus, and establish inactivating conditions regarding the temporary account according to user setting inputted from the above UI. The UI may include at least one of a first menu for determining the inactivating conditions according to user setting, and a second menu for establishing functions provided to the temporary account. The inactivating conditions may include a valid time period of the temporary account or a number of jobs that can be performed.

According to the above various embodiments, job performing results can be managed by creating accounts temporarily activated for each user terminal apparatus. Thereby, exposing job performing records or results to other persons can be prevented and more correct and efficient billing can be performed.

The foregoing and/or other features and utilities of the present general inventive concept may also be achieved by providing an image forming device usable with an image forming system, the image forming device including a processor unit configured to create and store a temporary account regarding an external user terminal apparatus in response to tagging of the external user terminal apparatus, to perform an image forming job in response to a request for the image forming job received from the external user terminal apparatus while the temporary account is valid, and to inactivate the temporary account when an inactivating condition of the temporary account is met.

The foregoing and/or other features and utilities of the present general inventive concept may also be achieved by providing a non-transitory computer-readable medium to contain computer-readable codes as a program to execute the method described above or hereinafter.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 11 illustrates an example of created account information in an image forming system according to an embodiment of the present general inventive concept;

FIG. 12 illustrates an example of an account information structure in an image forming system;

FIG. 13 illustrates an example of information regarding a job performing result in an image forming system;

FIG. 17 is a block diagram illustrating an image forming device according to an embodiment of the present general inventive concept.

DETAILED DESCRIPTION OF THE PREFERRED EMBODIMENTS

Figure 1:
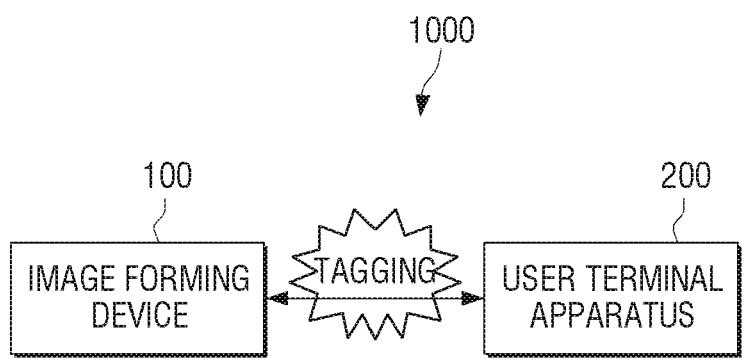
FIG. 1 is a block diagram illustrating an image forming system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

FIG. 1 is a block diagram illustrating an image forming system 1000 according to an embodiment of the present general inventive concept. Referring to FIG. 1, the image forming system 1000 includes an image forming device 100 and a user terminal apparatus 200. The image forming system 1000 indicates a system that includes a plurality of devices interoperating with each other to perform one or more image forming jobs.

The image forming device 100 indicates a device to perform one or more image forming jobs. The image forming device 100 may be implemented to be a printer, a scanner, a copy machine, a multi-function unit, or a fax machine. The image forming job may include a printing job of a print unit to print an image on a print medium according to print data, a scanning job of a scanning unit to scan a material to generate print data such that the print data is stored in a memory unit thereof or is printed on a print medium or transmitted to an external device, etc. since components of the image forming device 100, such as an image former, the print unit, the scanning unit, and so on are well-known, detail descriptions thereof will be omitted.

The user terminal apparatus 200 is configured to provide user interaction to a user. The user terminal apparatus 200 may be implemented to be a mobile phone, a tablet PC, a laptop PC, a PDA, a MP3 player, or the like. Although the user terminal apparatus 200 may be differently named, such as, mobile device, portable device, or display apparatus, it will be referred to as the user terminal apparatus 200 of the image forming system 1000. Although FIG. 1 illustrates one user terminal apparatus 200 for convenient explanation, there may be a plurality of user terminal apparatuses 200 according to a user or design preference.

The image forming device 100 creates and stores a temporary account regarding the user terminal apparatus 200 when the image forming device 100 communicates with or is connected to the user terminal apparatus 200. The temporary account indicates an account which is temporarily activated from a time when the account is registered, to a time when one or more inactivating conditions are met. The one or more inactivating conditions indicate a condition to inactivate the corresponding account. The inactivating conditions may include a valid time period established regarding the corresponding account, or a number of jobs that can be performed with the corresponding account. The image forming device 100 may create the temporary account by using information of the user terminal apparatus 200. A method of creating the account will be explained later.

When the temporary account is valid, in response to a request for an image forming job received from the user terminal apparatus, the image forming device 100 performs the requested image forming job. For example, an operation, such as scanning, printing, copying, or fax transmission, may be performed in the image forming device 100. After one or more jobs are performed, the image forming device 100 records information regarding one or more job performing results on the temporary account. For example, when a user whose ABC1 account is registered performs a copying job regarding 30 pages of writing materials, the image forming device 100 may record the performing result information indicating that a job of copying 30 pages of writing materials is performed on the ABC1 account.

The image forming device 100 may inactivate the temporary account when one or more inactivating conditions of the temporary account are met. For example, when the inactivating condition is established to have one day of a valid time period, i.e., when the valid time period is established to be one day, the image forming device maintains the corresponding account to be valid for one day from a time when the temporary account is created. At a time when one day elapses, the image forming device inactivates the corresponding account.

Further, when the inactivating condition is established to perform two jobs, the image forming device 100 may inactivate the corresponding account after a printing job and a fax transmission job are performed through the corresponding account. Inactivating indicates a situation in which any image forming job cannot be performed through the corresponding account. When two inactivating conditions are set, the image forming device 100 may inactivate the corresponding account when any one of the two inactivating conditions is satisfied.

After the temporary account is inactivated, when an image forming job is requested from the user terminal apparatus 200, the image forming device 100 informs the user terminal apparatus 200 that the image forming job cannot be performed, that a previous temporary account has been expired, and/or that it is necessary to reset at least one of the image forming device 100 and the user terminal apparatus 200 to create a new temporary account. The image forming device 100 and/or the user terminal apparatus 200 may have a reset function and structure such that the image forming device 100 can perform another temporary account creating operation.

Meanwhile, FIG. 1 illustrates that the image forming device 100 and the user terminal apparatus 200 transmit or receive data according to nearfield wireless communication (NFC) method by tagging. For example, when the image forming device 100 and the user terminal apparatus 200 respectively include a NFC chip (a nearfield frequency communication chip), the nearfield wireless communication may be performed in response to the tagging of the user terminal apparatus 200 to the image forming device 100.

The nearfield wireless communication is a noncontact wireless communication method using a 13.56 MHz frequency bandwidth, for example. Further, tagging indicates an operation in which the user terminal apparatus 200 moves toward the image forming device 100, approaches within a communication available range, and/or is disposed adjacent to the image forming device 100. Regarding the NFC chip, a distance of about 10 cm can be a communication available range. When the user terminal apparatus 200 approaches the image forming device 100 within the communication available range, information can be read between the NFC chip provided in the user terminal apparatus 200 and the NFC chip provided in the image forming device 100. The NFC chip may include a tag and/or a tag reader. The tag and the tag reader are well-known, and thus detail descriptions thereof will be omitted.

A user carrying the user terminal apparatus 200 may stand near to the image forming device 100, or put the user terminal apparatus 200 on the image forming device 100. In this case, because the user terminal apparatus 200 continues to operate within the communication available range of the image forming device 100, the nearfield wireless communication may continue to operate.

However, communication between the image forming device 100 and the user terminal apparatus 200 should not be necessarily performed according to the nearfield wireless communication method; communication may be performed with various communication methods according to a user or design preference. For example, the image forming device 100 may connect the user terminal apparatus 200 through various communication interfaces, such as WiFi, Bluetooth, Zigbee, 3G, and 4G, or through wire interfaces such as serial interface. When communication with the user terminal apparatus 200 connects through a specific communication interface, the image forming device 100 may create and store a temporary account as described above.

Meanwhile, although not illustrated in FIG. 1, the image forming system 1000 may further include a billing device. The billing device indicates a device to perform billing regarding the one or more image forming jobs performed in the image forming device 100. The billing device may be constituted to be a separate unit from the image forming device 100, or included within the image forming device 100.

The billing device may receive information on the one or more job performing results of the temporary account from the image forming device 100 in response to a tagging operation of the user terminal apparatus 200 or a billing request received by another user manipulation. When the job performing results information is received, the billing device may create billing information by performing a billing operation regarding the temporary account based on the job performing results information and preset billing information. The billing device may transmit the created billing information to at least one of the image forming device 100 and the user terminal apparatus 200. The job performing results information may include various pieces of information, such as a job type, a job performing amount, and a job performing time. When a printing payment is established to be 0.1$ per one page, the job type is printing, and the job performing amount is a bundle of 30 pages, for example, the billing device may create the billing information to charge 3$, for example. When the billing information is received, the user terminal apparatus 200 and the image forming device 100 may respectively inactivate or delete the temporary account.

Until the billing is paid or until a payment completion notice (confirmation) is received, the account may be recorded in the image forming device 100 while being inactivated. However, because the account is inactivated and exclusively allocated to the user terminal apparatus 200, a third party or another user terminal cannot voluntarily confirm or view the record or the data. Further, it may prevent a user from additionally using the image forming device 100 improperly. After paying the billing is finished, the account information recorded in the image forming device 100 is deleted, thereby providing a higher security thereto.

The user terminal apparatus 200 may interoperate with the image forming device 100 by using an application that is separately programmed. When such an application is not installed in the user terminal apparatus 200, the user terminal apparatus 200 may obtain information regarding a source to provide the application, i.e., source information from the image forming device 100, and download the corresponding application. For example, in response to tagging of the user terminal apparatus 200 to the image forming device 100, source information may be received according to the nearfield wireless communication method. The source information may include a URL, a MAC address, an IP address, and a telephone number. According to the received source information, the user terminal apparatus 200 may download the application by accessing a source device of the source information. When downloading is finished, the user terminal apparatus 200 may install and implement the application, and transmit device information of the user terminal apparatus to the image forming device 100 according to implementing of the application.

The image forming device 100 may create a temporary account by using the transmitted device information. For example, the device information may include various pieces of information, such as a telephone number, a product name, a serial number, a producer name, a user name, and an IP address. The image forming device 100 may create and store a temporary account regarding the user terminal apparatus 200 by using the received device information. The temporary account may be set to be associated with one or more inactivating conditions.

Such inactivating conditions may be directly established by a user through a user interface provided through the image forming device 100 or the user terminal apparatus 200, or one or more default conditions may be used as the inactivating conditions. Methods of creating a temporary account and establishing one or more inactivating conditions will be explained in a later part of the specification.

Figure 2:
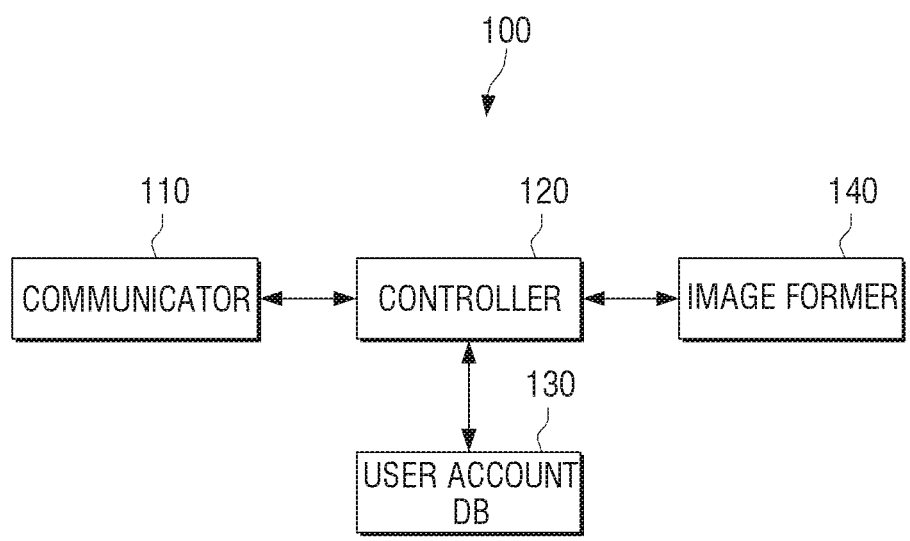
FIG. 2 is a block diagram illustrating an image forming device of an image forming system according to an embodiment of the present general inventive concept.

FIG. 2 is a block diagram illustrating the image forming device 100 of the image forming system 1000 of FIG. 1 according to an embodiment of the present general inventive concept. Referring to FIG. 2, the image forming device 100 includes a communicator 110, a controller 120, a user account DB (DataBase) or a storage unit 130, and an image former 140.

The communicator 110 is configured to perform communication with the user terminal apparatus 200. According to an embodiment, the communicator 110 may include various communication modules such as an NFC chip, a WiFi chip, or a Bluetooth chip which perform the non-contact or wireless communication.

The user account DB 130 is configured to store one or more accounts created regarding the user terminal apparatus 200.

The controller 120 is configured to control an overall operation of the image forming device 100. When communication with the user terminal apparatus 200 is performed, the controller 120 may create a temporary account regarding the user terminal apparatus 200 and record the account on the user account DB 130.

The image former 140 is configured to perform image forming jobs. Image forming jobs indicate jobs to form images on papers or other recording medium. The image forming jobs may be scanning, printing, copying, fax transmission, fax reception, or outputting.

When the temporary account is valid, in response to a request for an image forming job received from the user terminal apparatus 200, the controller 120 may perform the image forming job by controlling the image former 140. Thus, a user may use the image forming device 100 by using his temporary account while the account is valid.

The controller 120 may record the job performing results information regarding the image forming job on the temporary account and may manage the temporary account and/or the recorded information associated with the temporary account. Further, the controller 120 may inactivate the temporary account when the inactivating condition of the temporary account is met. The inactivating condition may include at least one among a valid time period of the temporary account, the number of jobs that can be performed with the temporary account, and the number of pages that can be printed with the temporary account. For example, when a 1-day valid time period is established, the controller 120 may inactivate the temporary account when one day elapses from a time of creating the temporary account. Further, when one job is established, the controller 120 may inactivate the temporary account when one image forming job is performed. Further, when the number of pages that can be printed is established to be 30, the controller 120 may inactivate the temporary account when the number of cumulative printing pages with the temporary account becomes 30.

When the temporary account is inactivated, in response to a request for an image forming job received from the user terminal apparatus 200, the controller 120 may transmit an error message to inform that the requested job by a user will not be performed through the communicator to the user terminal apparatus 200 without performing the image forming job. Further, if the image forming device 100 includes a display or a speaker internally, the controller 120 may output an error message through the display or the speaker.

Meanwhile, in response to a payment of the billing regarding the temporary account, the controller 120 may delete the account in which the billing is paid from the user account DB 130. Thereby, the user account DB 130 may be periodically or frequently updated.

Billing may be performed in various devices according to an embodiment. For example, the billing device separately provided may perform the billing. In one embodiment, the billing device may request information of the temporary account to the image forming device 100. The controller 120 may transmit the job performing results information recorded on the requested temporary account to the billing device. The billing device may perform the billing by using the job performing results information, and transmit the billing information. In response to the transmission of the billing information, the controller 120 may delete corresponding account.

The controller 120 may also perform operation to create a temporary account by using device information of the user terminal apparatus 200. The method of creating a temporary account will be explained below. The controller 120 may be one or more processors. The processor may be a semiconductor processor.

Figure 3:
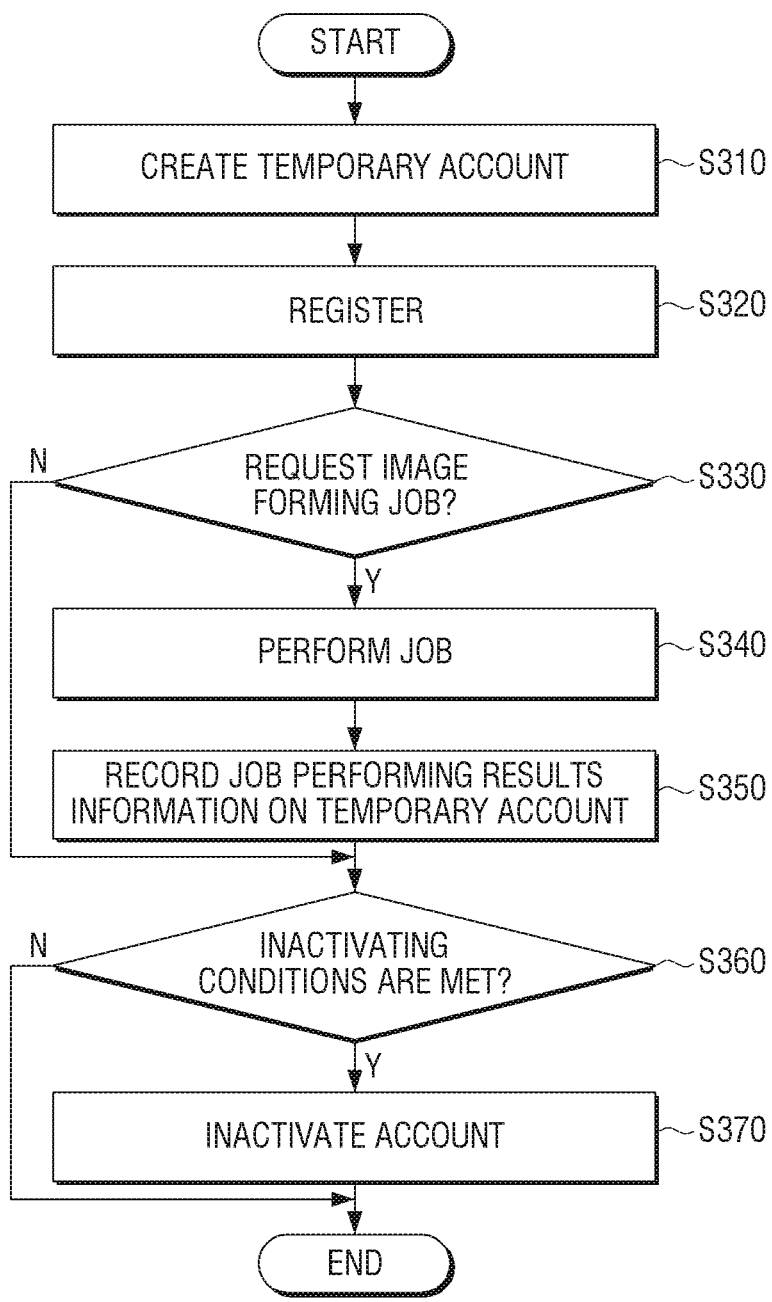
FIG. 3 is a flowchart illustrating a job performing method of an image forming system according to an embodiment of the present general inventive concept.

FIG. 3 is a flowchart illustrating a job performing method of the image forming system 1000 of FIG. 1 according to an embodiment of the present general inventive concept. Referring to FIG. 3, at operation S310, the image forming device 100 creates a temporary account regarding the user terminal apparatus 200 when communication between the user terminal apparatus 200 is performed. At operation S320, the image forming device 100 registers the created temporary account on a user account DB internally provided. Thereby, more than one piece of account information may be stored in the user account DB. According to an embodiment, the image forming device 100 may store account information on a server device separately provided from the image forming device. Account information may include all of valid accounts and inactivated accounts.

In response to a request for an image forming job received from the user terminal apparatus 200 having a valid account at operation S330, the image forming device 100 performs the requested job, at operation S340. If a password is established regarding the temporary account, the image forming device 100 may approve accessing of the user terminal apparatus 200 when a proper account name and a proper password are inputted through the user terminal apparatus 100.

At operation S350, job performing results information is recorded on the temporary account in the user account DB or the server device. When one or more inactivating conditions established for the temporary account are met at operation S360, the image forming device inactivates the corresponding account at operation S370.

Thereafter, in response to the payment of the billing regarding the temporary account, the image forming device may delete the temporary account from the user account DB. As described above, when the billing device is separately provided, the billing device may perform the billing. In this case, in response to a request for information regarding the temporary account received from the billing device, the job performing results information recorded on the temporary account may be transmitted to the billing device. The inactivation and the deletion of the temporary account may be performed at the same time when conditions for the inactivation and the deletion are sent to be same. It is possible that the inactivation and the deletion may be performed separately or independently when conditions for the inactivation and the deletion are set to be different from each other.

Figure 4:
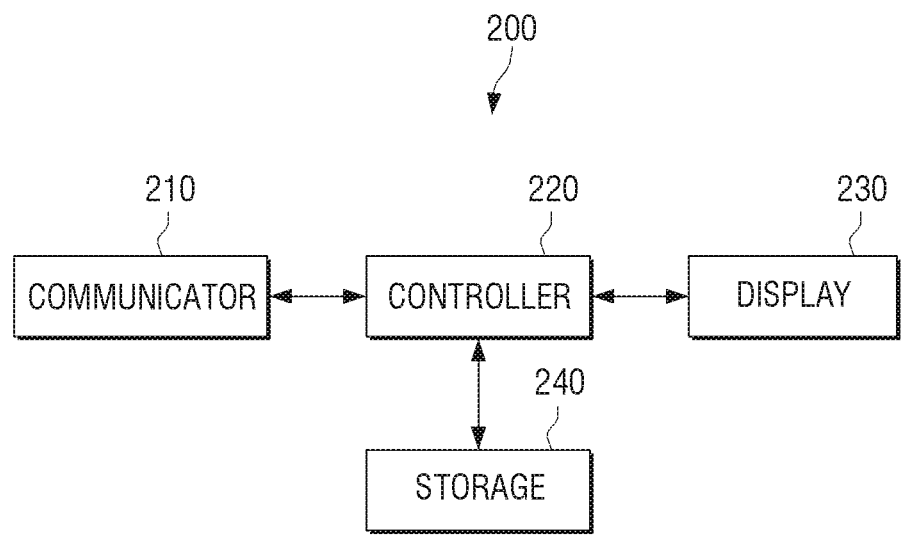
FIG. 4 is a block diagram illustrating a user terminal apparatus of an image forming system according to an embodiment of the present general inventive concept.

FIG. 4 is a block diagram illustrating the user terminal apparatus 200 of the image forming system 1000 of FIG. 1 according to an embodiment of the present general inventive concept. Referring to FIG. 4, the user terminal apparatus 200 includes a communicator 210, a controller 220, a display 230, and a storage 240.

The communicator 210 is configured to perform communication with various external devices including the image forming device 100. The communicator 210 may also include various communication modules such as the communicator 110 of the image forming device 200.

The controller 220 is configured to control an overall operation of the user terminal apparatus 200.

The display 230 is configured to display various UI screens according to controlling of the controller 220.

The storage 140 is configured to store various programs and data which are requested to drive the user terminal apparatus 200. The controller 220 may perform various controlling operations by using the stored programs and data in the storage 240.

For one example, the controller 220 may implement an application to interoperate with the image forming device 100, and display a UI screen regarding the image forming device 100 on the display 230 to perform the controlling operation when a printing command regarding contents such as documents or pictures displayed on the display 230 is inputted. Further, when tagging the image forming device 100 is performed, the controller 220 may display the UI screen by automatically implementing the corresponding application to perform the controlling operation. A user may select one or more contents that the user wants to print and select a job through the UI screen. When the contents and job are selected, the controller 220 may generate a job command by using the application, and transmit the generated job command and the contents to the image forming device 100 through the communicator 210.

Further, the storage 240 may store various pieces of information on the user terminal apparatus 200. For example, the storage 240 may store various pieces of information such as a telephone number, a product name, a serial number, a producer name, a user name, an IP address, and/or a MAC address. For convenient explanation, the information stored in the user terminal apparatus 200 may be referred to as device information. The controller 220 may transmit the device information to the image forming device 100 through the communicator 210. When a temporary account is created in the image forming device 100, the controller 220 may receive the account information through the communicator 210 from the image forming device 100.

The controller 220 may display controlling information on the UI screen when the account information is received. A user may perform the logging by selecting the account, and select contents and a job on the controlling information of the UI screen. The controller 220 may generate a command to process the selected contents, and transmit the command to the image forming device 100 through the communicator 210.

Meanwhile, when the account is not valid, i.e., when a valid time period of corresponding account elapses or when a preset number of jobs are already performed, the controller 220 may display an error message on the display 230 to inform that a job cannot be performed.

Meanwhile, as described above, according to an embodiment, when an application to interoperate with the image forming device 100 is not installed on the storage 240, the controller 220 may receive source information from the image forming device 100, and download an application according to the received source information.

Figure 5:
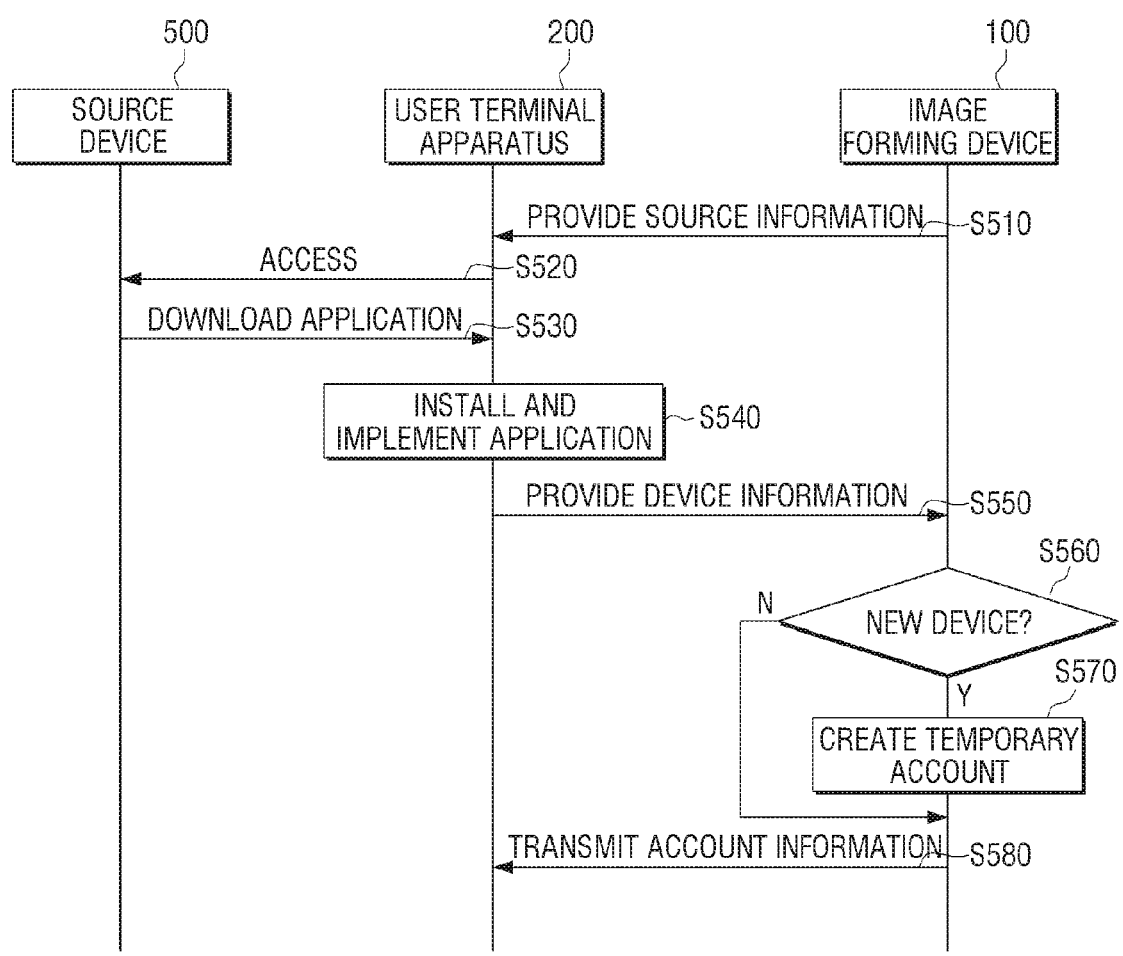
FIG. 5 is a view provided to explain a method creating accounts of the image forming system according to an embodiment.

FIG. 5 is a view illustrating a method of creating an account in the image forming system 1000 of FIG. 1 according to an embodiment of the present general inventive concept. Referring to FIG. 5, the user terminal apparatus 200 may receive source information when tagging the image forming device 100 is performed at operation S510. The source information may be trans-received (transmitted or received) according to the nearfield wireless communication method and other various communication methods. The source information may include various pieces of information that can be accessed to a source device 500 such as a URL, a MAC address, an IP address, and a telephone number. The source information may include device information regarding the image forming device 100. For example, it may further include pieces of information such as manufacturer information, a product name, a serial number, and position information that can specifies a dimension where the image forming device 100 is established.

At operation S520, the user terminal apparatus 200 accesses the source device 500 by using the source information. The source device 500 indicates a server device to perform an application store function which provides various applications with or without the payment.

At operation S530, the user terminal apparatus 200 may download the corresponding application by accessing the source device 500. In a case of a plurality of applications, the user terminal apparatus 200 may selectively download an application associated with the device information of the corresponding image forming device 100.

At operation S540, the user terminal apparatus 200 may install and implement the application on the storage 240 when an application is downloaded.

At operation S550, the user terminal apparatus 200 may provide the device information to the image forming device 100 according to implementing of the application.

At operation S560, the image forming device 100 may determine whether the device is new or not by comparing registered information (or reference information) on the user account DB with the device information. If the device is new after determining, the image forming device 100 creates a temporary account at operation S570.

At operation S580, account information regarding the created temporary account is transmitted to the user terminal apparatus 200. The user terminal apparatus 200 may use image forming jobs by accessing the temporary account with the account information.

Figure 6:
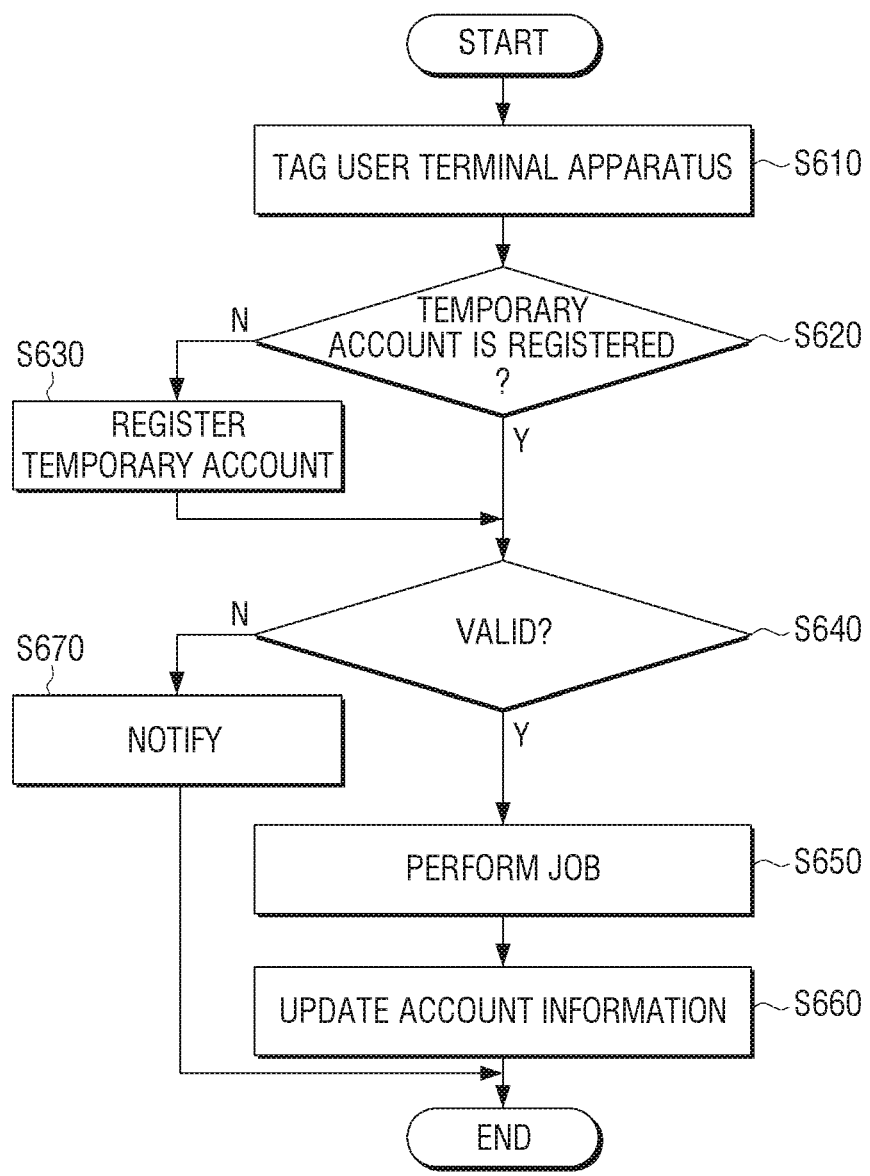
FIG. 6 is a flowchart illustrating a job performing method of an image forming device according to an embodiment of the present general inventive concept.

FIG. 6 is a flowchart illustrating a job performing method of the image forming system 1000 according to an embodiment of the present general inventive concept. Referring to FIG. 6, in response to tagging of the user terminal apparatus 200 at operation S610, the image forming device determines whether there are registered temporary accounts at operation S620. If there is no temporary account, the image forming device creates and registers a new temporary account at operation S630.

Meanwhile, if there is a registered temporary account, the image forming system 1000 determines whether the account is valid at operation S640. When the account is valid after determining, the image forming device performs the image forming job requested from the user terminal apparatus 200 at operation S650. When the job is finished, the image forming device 100 records the job performing results information on the corresponding account, and updates the account information at operation S660.

Meanwhile, when the account is registered but inactivated at operation S640, the image forming device 100 may inform a user that the job cannot be processed at operation S670. When the image forming device 100 includes a display or a speaker, the image forming device 100 may output an error message to inform a user that the job cannot be processed through the display or the speaker. Further, the image forming device 100 may transmit an error message to the user terminal apparatus 200 so that the user terminal apparatus 200 can output the message to a user.

As described above, a temporary account can be created with at least one of various methods. The image forming device 100 may create one or more inactivating conditions and account information by applying options established as a default option by a device manager, or according to selection by a user. Further, the image forming device 100 may determine whether a user applies the default option or manually creates account information according to a user selection.

Figure 7:
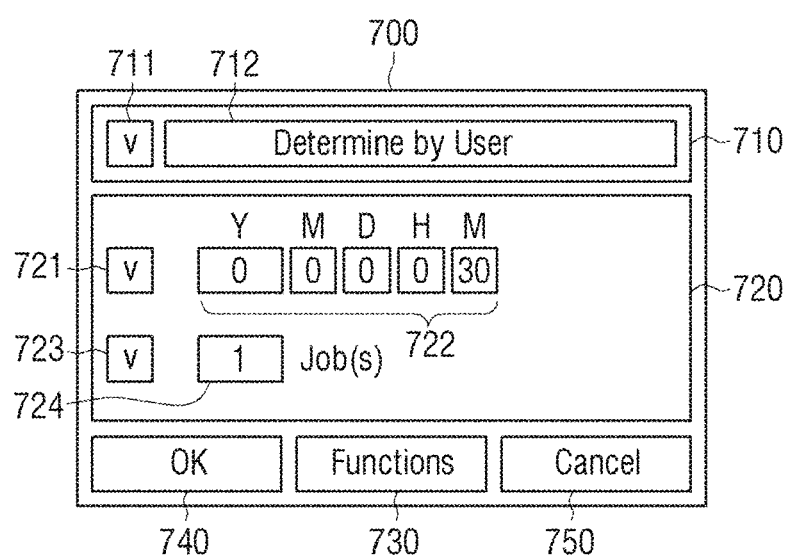
FIGS. 7, 8, and 9 are block diagrams illustrating various UI screens.

FIG. 7 illustrates one example of a UI screen 700 so that a user can selectively create a temporary account. Referring to FIG. 7, the UI screen 700 may include a first menu 710 to determine one or more inactivating conditions according to establishing of a user and a second menu 730 to establish one or more functions provided to a temporary account.

The first menu 710 may include a select area 711 and a text area 712. When a user selects the select area 711, a check symbol may be marked. When the corresponding menu 710 is selected, the text area 712 may display texts to inform that a user can directly establish the one or more inactivating conditions. FIG. 7 illustrates the UI screen 700 including a display window in which "Determine by User" is displayed as one example.

When the first menu 710 is selected, an area 720 is activated to establish the inactivating conditions. The inactivating condition establishing area 720 may include various areas such as a first area 721 to select one or more valid time period establishing options, a first input area 722 to input a valid time period, a second area 723 to select one or more job number establishing options, and a second input area 724 to input the number of jobs. When a user wants to select a valid time period, the user may select the first area 721 and input year (Y), month (M), date (D), hour (H), and minute (M) on the first input area 722. Further, when a user wants to select the number of jobs, the user may select the second area 723, and input a number on the second input area 724.

When the first menu 710 is not selected, the controller 120 may establish the one or more inactivating conditions uniformly to the method established by a manager, i.e., a default setting. For example, when a manager establishes one day of the valid time period regarding a temporary account, the controller 120 may automatically inactivate every temporary account after one day passes from a time of creating a temporary account. Further, when a manager establishes one or more inactivating conditions to allow two jobs per temporary account, the controller 120 may inactivate a temporary account when two jobs are performed.

The UI screen 700 may further include a menu 740 to approve the established options, a menu 730 to establish one or more functions provided to a temporary account, and a menu 750 to delete the UI screen 700. When a user selects the OK menu 740, the controller 120 creates a temporary account according to the established options by a user. Further, when a user selects the cancel menu 750, the controller 120 deletes the UI screen 700.

Figure 8:
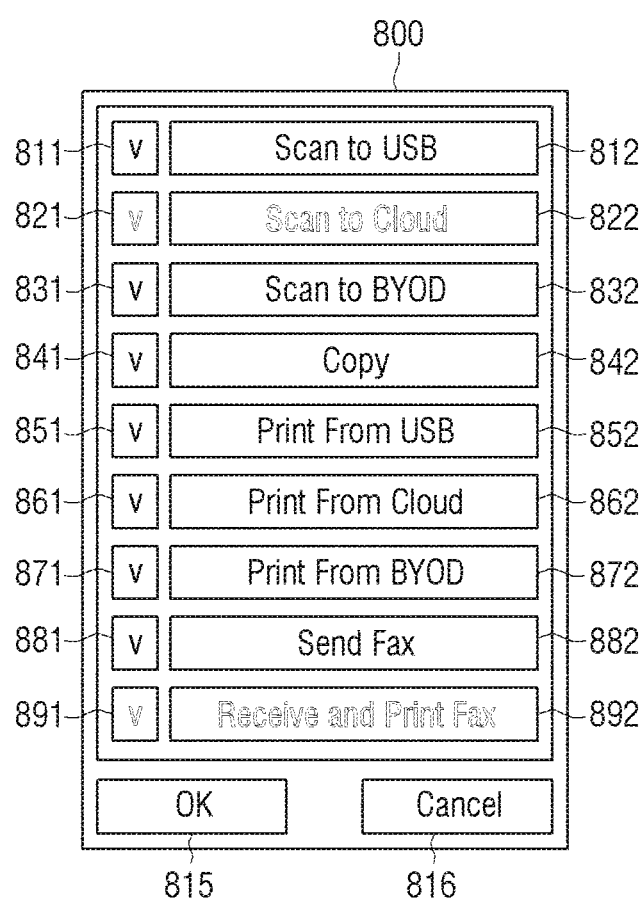

When a user selects the menu 730, the controller 120 may display a UI screen illustrated in FIG. 8. FIG. 8 illustrates one example of a UI screen 800 in which functions provided to a temporary account can be selected.

Referring to FIG. 8, the UI screen 800 may display a plurality of select areas 811~891 and text areas 812~892 respectively corresponding to the select areas 811~891. The text areas 812~892 may display names of functions that can be selected. A user may select at least one of the select areas 811~891, and establish corresponding functions. When selecting is finished, a user may select a OK menu 815, and complete the establishing operation. When the OK menu 815 or the cancel menu 816 is selected, the controller 120 deletes the function to establish the UI 800 and displays the UI 700 of FIG. 7 again.

The image forming device 100 may differently select the options corresponding to the device information obtained from the user terminal apparatus 200 when creating an account according to establishing by a manager or a user.

Figure 9:
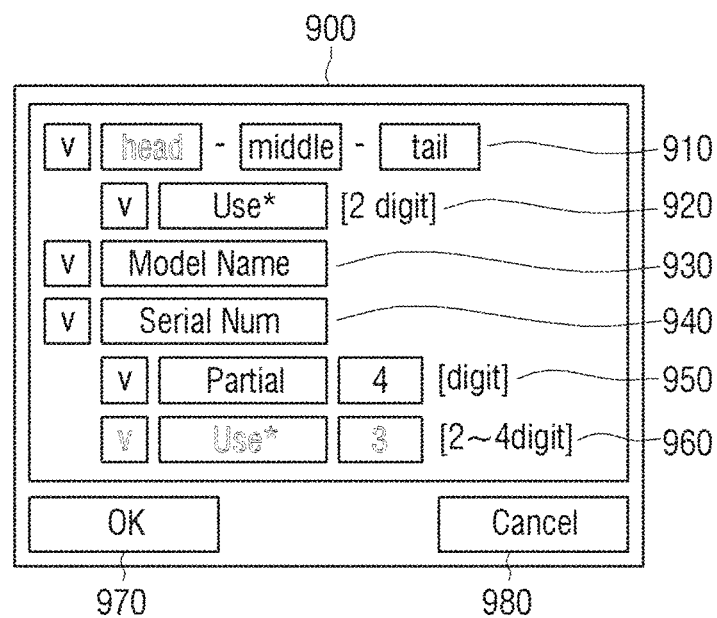

For example, the image forming device 100 may provide a UI screen 900 of FIG. 9. Referring to FIG. 9, the UI screen 900 includes a first menu 910 to select at least one or more digits within the telephone number digits, second menu 920 to select whether to substitute and use some digits of the telephone number with a special symbol, a third menu 930 to select whether to use a product name, a fourth menu 940 to select whether to use a serial number, a fifth menu 950 to select whether to use some digits of the serial number, and a sixth menu 960 to select whether to substitute and use some digits of the serial number with a special symbol. The UI screen 900 may include a OK menu 970 to approve the establishing, and a cancel menu 980 to delete the UI screen 900 or to replace the UI screen 900 with a new screen corresponding to a function thereof.

The first menu 910 is a menu to select one or more groups from a plurality of groups constituting the telephone number. For example, a mobile phone number is divided into three groups like 010-1234-5678 in Korea. A user may select the first menu 910, and determine which group is used or whether to use more than two groups. When a user selects a middle group, the controller 120 may extract 1234 among the telephone number. When the middle group and a tail group are selected together, the controller 120 may respectively extract 1234, 5678 from the telephone number. When more than two groups are selected, a user may select the second menu 920. When the second menu 920 is selected, the controller 120 substitutes some digits of the telephone number with a special symbol. FIG. 9 illustrates that 2 digit numbers are substituted with a special symbol, *. Further, a user may select the third menu 930 and the fourth menu 940, and a use model name and a serial number as an account name.

When a serial number is used, a user may use some digits of the serial number by selecting the fifth menu 950. Further, a user may select a number of digits to be used on the fifth menu 950. FIG. 9 illustrates that four digits are established to be used from the serial number. Further, a user may substitute and use the serial number with a special symbol (e.g., *) by selecting the sixth menu 960. Likewise, the user may select a number of digits that are substituted with a special symbol. When various options are established through the UI screen 900 and a OK menu 970 is selected, the controller 120 may create a temporary account by using the established options. Thus, the image forming device 100 may create a temporary account based on the device information of the user terminal apparatus 200.

Figure 10:
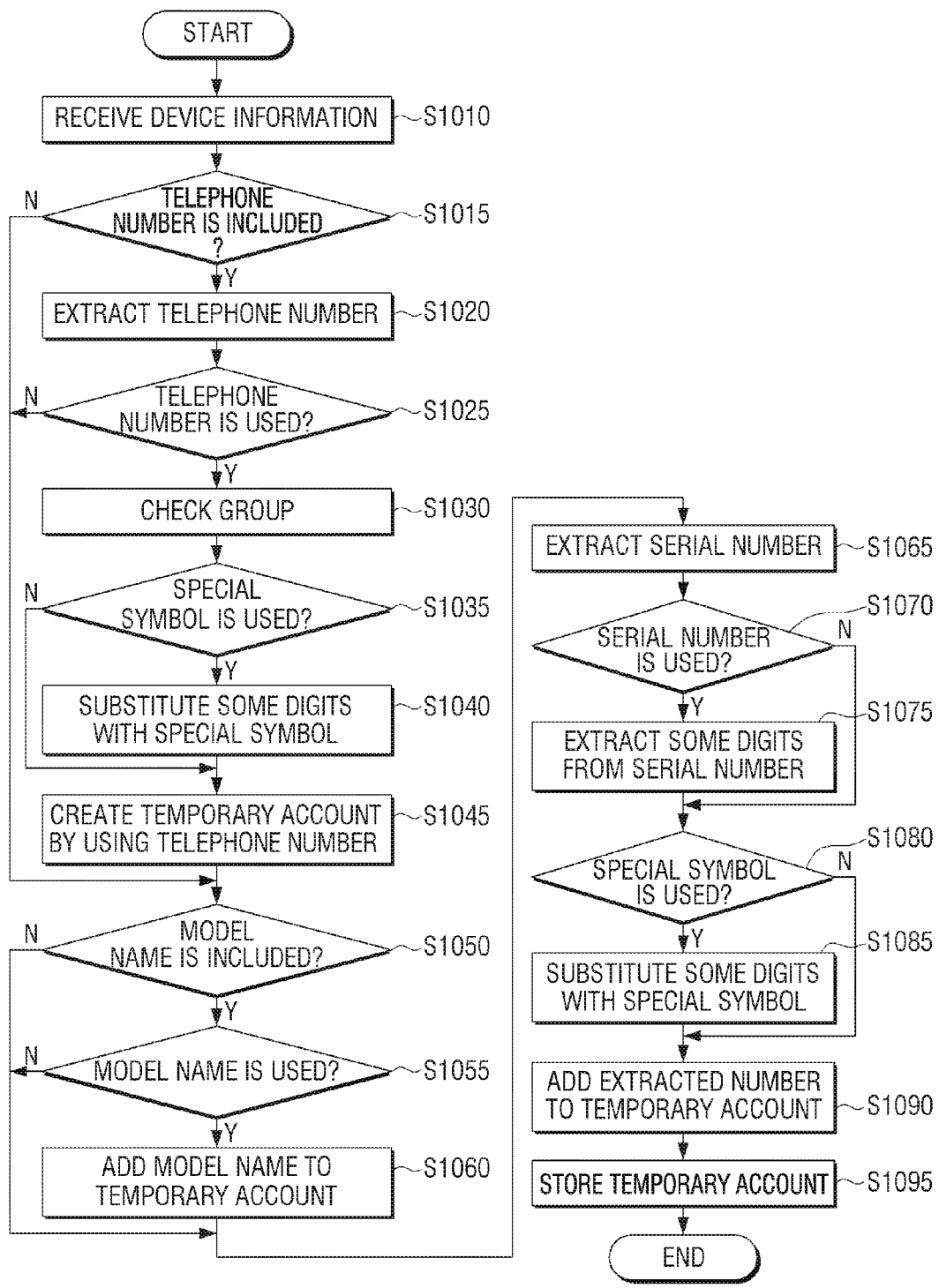
FIG. 10 is a flowchart illustrating a method of creating an account according to one or more options established through the UI screen of FIG. 9.

FIG. 10 is a flowchart illustrating a method of creating a temporary account in the image forming system 1000 of FIG. 1. Referring to FIG. 10, when the device information is received at operation S1010, the image forming device 100 determines whether the device information includes a telephone number at operation S1015. When the telephone number is included as a determining result, the telephone number is extracted at operation S1020. When the telephone number is extracted, the image forming device 100 confirms whether one or more options using the telephone number are established at operation S1025. For example, it may determine whether the first menu 910 is established on the UI screen 900 of FIG. 9. When an option using the telephone number is established, the image forming device 100 checks determined groups at operation S1030, and extracts digit numbers of the corresponding group. Further, the image forming device 100 confirms whether options substituting some digits of the telephone number with a special symbol are established at operation S1035. For example, it may check whether the second menu 920 is established on the UI screen of FIG. 9. When the second menu 920 is established as a determining result, the image forming device 100 substitutes some digits of the number with a special symbol at operation S1040. Although FIG. 9 illustrates a special symbol to be *, it may not be limited thereto. It is possible that any symbol can be useable sa the special symbol.

At operation S1045, the image forming device 100 may create a temporary account by using at least a portion of the telephone number including the special symbol.

At operation S1050, the image forming device 100 may determine whether a model name is included in the device information. When the model name is included as a determining result, the image forming device 100 may confirm whether the model name is used or not at operation S1055. For example, it may confirm whether the third menu 930 is established on the UI screen of FIG. 9. When the third menu 930 is established, the image forming device 100 may add the model name to the temporary account at operation S1060.

Further, the image forming device 100 may extract the serial number at operation S1065 when the device information includes the serial number. When the serial number is extracted, the image forming device 100 may determine whether the serial number is used at operation S1070. For example, it may confirm whether the fourth menu 940 is established on the UI screen of FIG. 9. When a corresponding menu is established, the image forming device 100 extracts some digits from the serial number at operation S1075. Further, the image forming device 100 may confirm whether the sixth menu 960 is established on the UI screen 900 of FIG. 9. When the sixth menu 960 is established, the image forming device 100 may determine that a special symbol is used at operation S1080. At operation S1085, the image forming device 100 may substitute at least some digits of the serial number with a special symbol. For one example of the special symbol, "*" may be used; however, it may not be limited thereto.

At operation S1090, the image forming device 100 may add the extracted number digits from the serial number to the temporary account. At operation S1095, the image forming device 100 may finally create and store new temporary account. The options established or set through the UI screen 900 may be associated with the newly created temporary account such that the options can be useable to identify the user terminal apparatus 200 or to perform a function associated with the temporary account.

FIG. 11 illustrates information, for example, various examples of account names regarding the temporary account. For example, when a telephone number of the user terminal apparatus 200 is 010-1234-5678, its model name is Galaxy S4, and its serial number is A12Q34W56, it may create a temporary account to have at least one of names that can be variously combined with a telephone number, a special symbol, a model name, and a serial number such as 12345678, 5678, 1*345*78, 5678_GalaxyS4, GalaxyS4_4W56, and 12*45*78_GalaxyS4_4W56. That is, the temporary account may use at least a portion of the existing information to have an account name as described above. The controller 120 stores the created temporary accounts on the user account DB 130.

FIG. 12 illustrates account information stored in the user account DB 130 of FIG. 2. Referring to FIG. 12, the user account DB 130 may store various pieces of information such as an account name 1210, user terminal apparatus information 1220, a creating date information 1230, a valid time period 1240, job performing results information 1250, and billing information 1260. FIG. 12 illustrates that the valid time period 1240 is stored; information regarding a number of jobs or a number of pages may be stored when they are established as one or more inactivating conditions.

FIG. 13 illustrates information on job performing results. Referring to FIG. 13, image forming jobs include various jobs such as scan-to-USB, scan-to-Cloud, scan-to-BYOD, and copy, and a number of pages is recorded per job according to a paper size and color printing. FIG. 13 illustrates the paper size to be A3 and A4 only, and the printing to be classified only into color or mono. However, other classifying standards such as different paper sizes or duplex/simplex may be further added.

The above various UI screens may be displayed on the image forming device 100 when the image forming device 100 includes the display. However, it may not be limited thereto. Thus, when communication with the user terminal apparatus 200 is available, the controller 120 of the image forming device 100 may provide one or more UI screens to a user through the user terminal apparatus 200.

Figure 14:
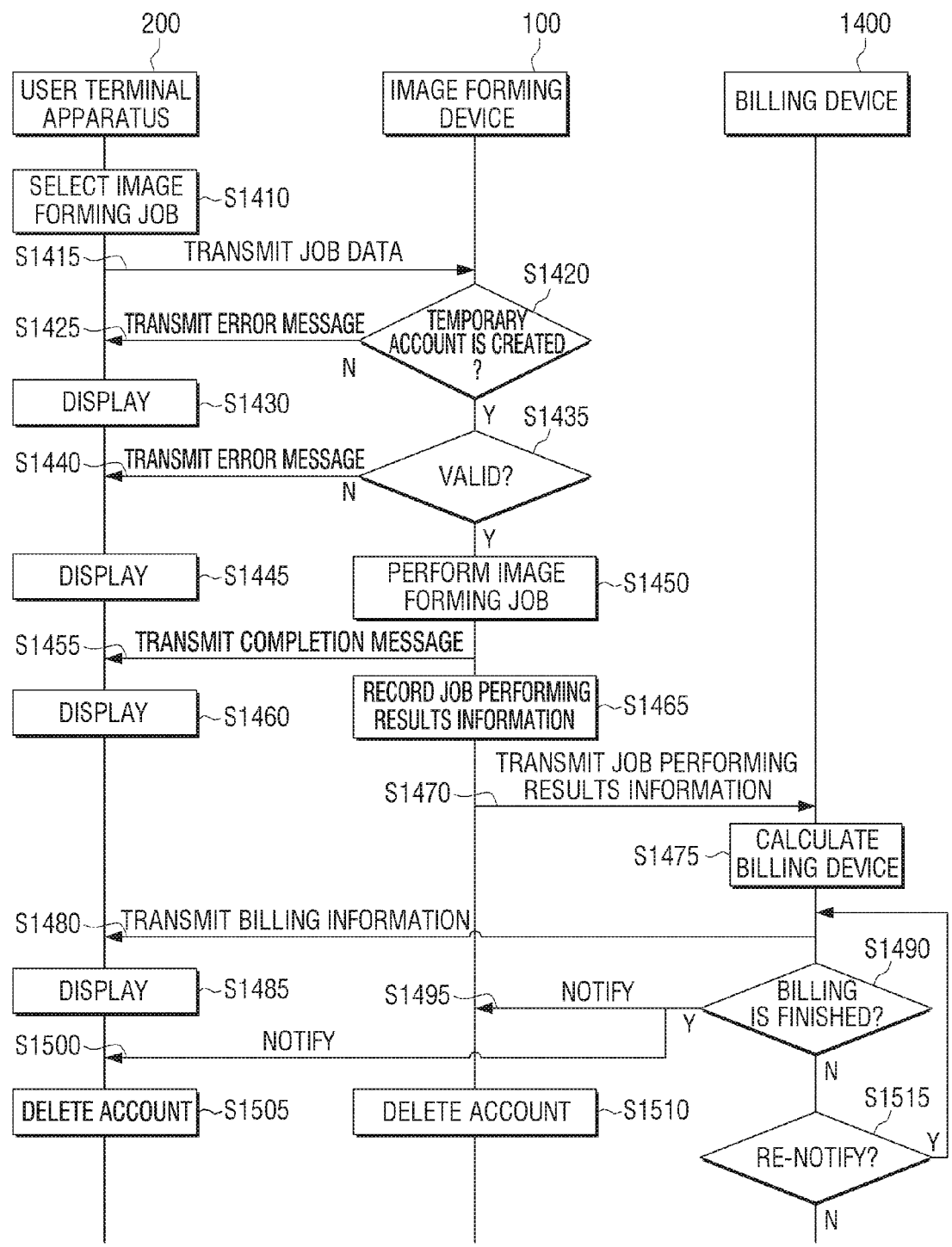
FIG. 14 is a view illustrating a billing method according to an embodiment of the present general inventive concept.

FIG. 14 is a flowchart illustrating a billing method of the image forming system 1000 of FIG. 1 according to an embodiment of the present general inventive concept. Referring to FIG. 14, when an image forming job is selected at operation S1410, the user terminal apparatus 200 may transmit job data to the image forming device 100 at operation S1415. Job data may include various pieces of information such as a job command and device information of the user terminal apparatus 200. When an application to interoperate with the image forming device 100 implements, the user terminal apparatus 200 may display a UI screen so that a user can select an image forming job by using the above UI screen. The controller 220 of the user terminal apparatus 200 may transmit the selected image forming job to the image forming device 100.

According to an embodiment, in response to tagging of the user terminal apparatus 200 to the image forming device 100 while specific contents are displayed, the user terminal apparatus 200 may transmit job data including a job command to request an image processing operation regarding the displayed contents to the image forming device 100. In this case, the user terminal apparatus 200 may transmit its device information together. As described above, when an application is not previously installed, the user terminal apparatus 200 may download and install an application from an external source device according to source information provided by the image forming device 100.

At operation S1420, the image forming device 100 may determine whether there is a corresponding temporary account to the user terminal apparatus 200. When there is no corresponding temporary account as a determining result, the image forming device 100 may transmit an error message to the user terminal apparatus 200 at operation S1425. When an error message is received, the user terminal apparatus 200 may inform a user that the job cannot be performed by displaying the message at operation S1430. According to an embodiment, when there is no corresponding temporary account, it may perform a job creating a temporary account.

The image forming device 100 may transmit a message to request whether a user wants to create an account to the user terminal apparatus 200 when there is no corresponding temporary account. The user terminal apparatus 200 may display the received message. When a user inputs a request to create an account in response to the message, the user terminal apparatus 200 may transmit the account creating request to the image forming device 100. According to the request, the image forming device 100 may create a temporary account according to the above method.

Meanwhile, when there is corresponding temporary account, the image forming device 100 determines whether the account is valid at operation S1435. When the account is not valid, the image forming device 100 transmits an error message to the user terminal apparatus 200 at operation S1440. At operation S1445, the user terminal apparatus 200 displays the error message so that a user can recognize that the job cannot be performed. When the job cannot be performed, a user may input a request to create a temporary account again, and perform an account creating job.

Meanwhile, when the temporary account is valid, the image forming device 100 implements the requested job by the user terminal apparatus 200 at operation S1450. When the job completes, the image forming device 100 transmits a completion message to the user terminal apparatus 200 at operation S1455. When the completion message is received, the user terminal apparatus 200 informs a user of the completion by displaying the message at operation S1460. Further, the image forming device 100 records the job performing results information on the corresponding account at operation S1465, and transmits the job performing results information to the billing device 1400 at operation S1470 when a specific event occurs. The specific event may be various events such as an event in which the billing device 1400 requests the job performing results information, an event in which a preset period approaches, an event in which a billing request is inputted from the image forming device 100 or the user terminal apparatus 200, and an event in which the temporary account is closed, invalidated, or deselected.

When the job performing results information is received at operation S1470, the billing device 1400 calculates billing information at operation S1475. The billing device 1400 performs the billing by applying a preset billing table regarding a type and a number of the pages processed in the image forming device 100 and a type of the processed job.

When billing information is calculated, the billing device 1400 may transmit the billing information to the user terminal apparatus 200 at operation S1480. When the billing information is received, the user terminal apparatus 200 may display the information at operation S1485. A user may confirm the billing information displayed on the user terminal apparatus 200, and pay the cost corresponding to the billing. The cost may be paid by sending cashes through a payment device connected to the billing device 1400 or using credit cards according to a payment method. At operation S1490, the billing device 1400 may determine that payment completes according to the billing information when cashes are received or credit cards are approved.

Further, when an electronic payment application, such as a smart wallet, is installed in the user terminal apparatus 200, a user may pay the cost by using the electronic payment applications. In this case, when the user terminal apparatus 200 or a payment server device informs the billing device 1400 of the payment, and then the billing device 1400 may determine that the payment is completed. The payment process is well known, and thus detail descriptions thereof will be omitted.

When the payment is completed, the billing device 1400 may respectively inform the image forming device 100 and the user terminal apparatus 200 that the payment is completed at operations S1495 and S1500. When the payment is determined to complete, the image forming device 100 and the user terminal apparatus 200 may respectively delete the account at operation S1505 and S1510.

Meanwhile, when the cost is not paid for a certain time at operation S1515, the billing device 1400 may transmit the billing information again at operation S1480. The image forming device 100 may store the account information until the billing is completely processed.

Figure 15:
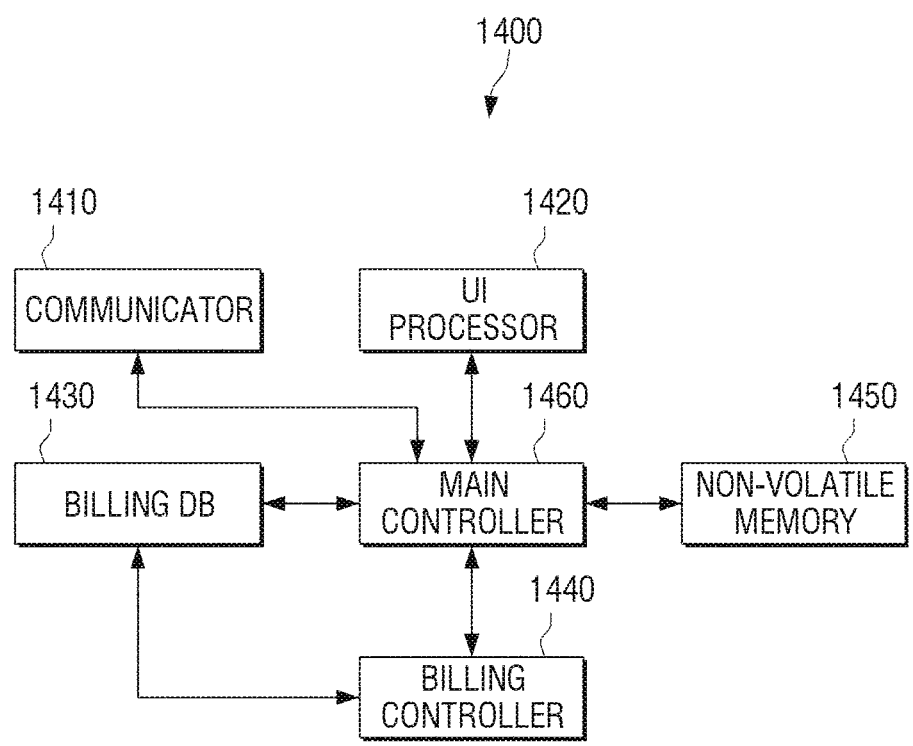
FIG. 15 is a block diagram illustrating a billing device according to an embodiment of the present general inventive concept.

FIG. 15 is a block diagram illustrating the billing device 1400 of FIG. 14 according to an embodiment of the present general inventive concept. Referring to FIG. 15, the billing device 1400 includes a communicator 1410, a UI processor 1420, a billing DB 1430, a billing controller 1440, a non-volatile memory 1450, and a main controller 1460.

The communicator 1410 is configured to perform communication with various external devices such as the user terminal apparatus 200 or the image forming device 100. When the communicator 1410 includes an NFC chip, data may be transmitted or received between the user terminal apparatus 200 according to tagging of the user terminal apparatus 200. Further, the communicator 1410 may perform communication with external devices by using various communication interfaces, such as WiFi, Bluetooth, Zigbee, LAN, 3G, 4G, and a serial interface. The communicator 1410 may receive job performing results information from the image forming device 100, or transmit the billing information to at least one of the image forming device 100 and the user terminal apparatus 200.

The UI processor 1420 is configured to perform user interaction. The UI processor 1420 may include a display panel which receives information necessary for the billing and displays the billing information, and an inputting means to control UI screens displayed on the display panel. When a touch sensor is included within the display panel, the UI processor 1420 may be implemented to be a touch screen.

The billing DB 1430 is database to store billing standards. Billing standards may be established to be various standards such as a page type, a job type, a job performing time, an establishing area, a user record, color applying (selection), and duplex applying (selection).

The billing controller 1440 is configured to perform the billing based on the job performing results information received through the communicator 1410 and the billing standards stored in the billing DB 1430. For example, when 0.1$ is paid for printing one paper with color-printing and A4 paper and when 30 pages are printed, 3$ is calculated as a payment cost. The billing controller 1440 creates billing information requesting the calculated payment cost and informs the main controller 1460 of the billing information. Further, the billing controller 1440 may store the created billing information on the billing DB 1430.

When the billing information is created, the main controller 1460 may transmit the billing information through the communicator 1410 to the user terminal apparatus 200 and/or the image forming device 100.

The non-volatile memory 1450 is a semiconductor memory to store various programs and data necessary for an operation of the main controller 1460. The main controller 1460 may perform the above described controlling operation according to implementing of the stored programs.

Figure 16:
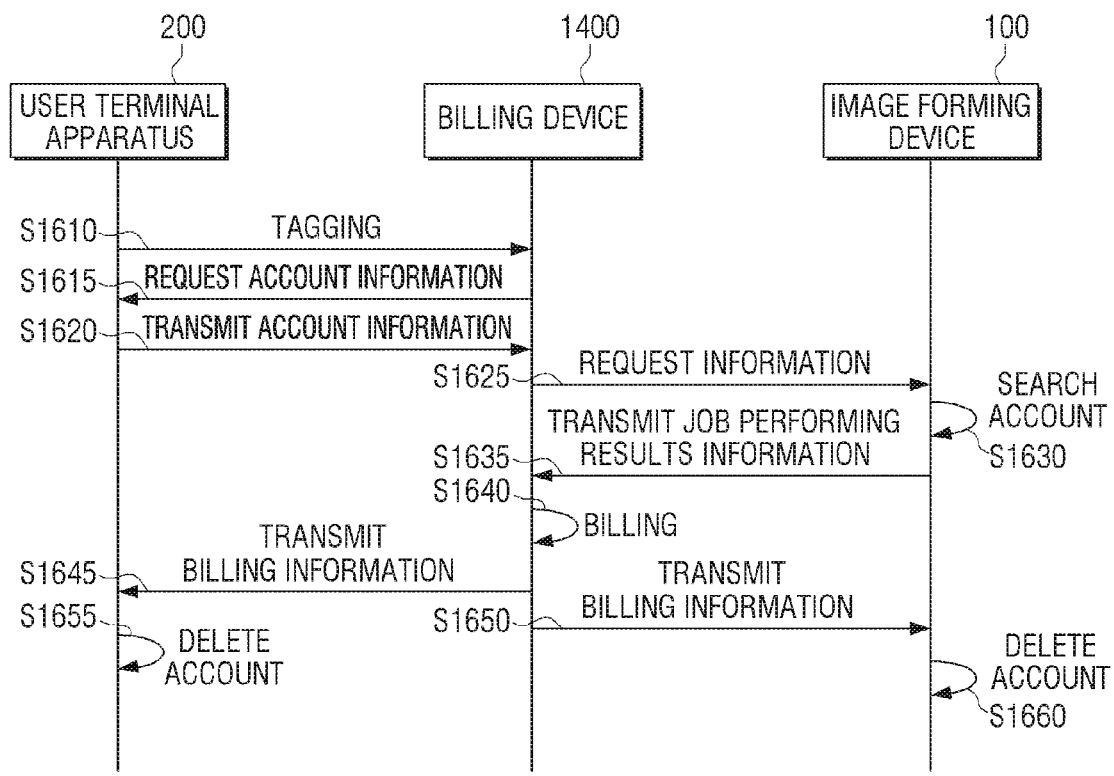
FIG. 16 is a view illustrating a billing method according to an embodiment of the present general inventive concept.

FIG. 16 is a view illustrating a billing method according to an embodiment of the present general inventive concept. FIG. 14 illustrates that billing is performed when the image forming device 100 transmits job performing results information to the billing device 1400. However, the present general inventive concept is not limited thereto. It is possible that a billing process may be triggered by the user terminal apparatus 200.

Referring to FIG. 16, in response to tagging of the user terminal apparatus 200 to the billing device 1400, the billing device 1400 requests account information to the user terminal apparatus 200 at operation S1615. The user terminal apparatus 200 may transmit the prestored account information at operation S1620.

When the account information is received, the billing device 1400 may request information regarding the corresponding account to the image forming device 100 at operation S1625. The image forming device 100 searches for an account according to the request of the billing device 1400 at operation S1630. When an account is searched as the temporary account, the image forming device 100 transmits the job performing results information recorded on the corresponding account to the billing device 1400 at operation S1635.

At operation S1640, the billing device 1400 may perform the billing based on the transmitted job performing results information and billing standards. When billing completes, the billing device 1400 may respectively transmit billing information to the user terminal apparatus 200 and the image forming device 100 at operations S1645 and S1650.

At operations S1655 and S1660, the image forming device 100 and the user terminal apparatus 200 respectively delete the account when the billing information is transmitted.

The billing method illustrated in FIG. 16 may be performed by the billing device 1400 including the constitution explained in FIG. 15; however, the present general inventive concept may not be limited thereto.

Meanwhile, one billing device may be connected to a plurality of image forming devices. In this case, a user may create and use a temporary account respectively in more than two image forming devices using a user terminal apparatus, and process the billing. The billing device 1400 may respectively perform the uniform billing process regarding a plurality of temporary accounts of the image forming devices and calculate together. For example, when pieces of user information are uniform to each other, the billing device 1400 may add billing receipts regarding a plurality of accounts, and create billing information requesting the adding cost to a corresponding user.

According to the above various embodiments, the image forming device may create and manage valid accounts temporarily regarding the user terminal apparatus. Although an image forming device is illustrated in FIG. 2 as an example, detailed constitution of the image forming device may be variously modified according to an embodiment of the present general inventive concept.

FIG. 17 illustrates the image forming device 100 of FIGS. 1 and 2 according to an embodiment of the present general inventive concept.

Referring to FIG. 17, the image forming device 100 includes the communicator 110, the controller 120, the user account DB 130, the image former 140, the storage 150, and the display 160.

The communicator 110 is configured to perform communication with various external devices. Referring to FIG. 16, the communicator 110 may include various units such as a WiFi chip 111, a Bluetooth chip 112, an NFC chip 113, and a LAN port 114. Although FIG. 17 illustrates the units 111, 112, and 113 to perform WiFi, Bluetooth, and NFC communications to be semiconductor chips, they may not be necessarily implemented to be semiconductor chips. Thus, the units 111, 112, and 113 may be referred to as modules or interfaces.

The user account DB 130 is database to store a corresponding temporary account to a user. The descriptions thereof are described above, and thus further explanations will be omitted.

The image former 140 includes the printer 141 and the scanner 142. The printer 141 is configured to feed papers and forming images on the papers. The scanner 142 is configured to scan documents and read images included in the documents. The image former 140 may perform various image forming jobs by using at least one of the printer 141 and the scanner 142. The printer 141 and the scanner 142 may be variously implemented according to types. Since the image former 140 is well-known, detail descriptions thereof will be omitted.

The storage 150 is configured to store programs and data necessary for an operation of the controller 120. The storage 150 may store software (program), such as an O/S 151, an account managing module 152, and an information processing module 153.

O/S (Operating System) 151 performs functions of controlling and managing an overall operation of hardware. Specifically, OS 151 performs basic functions such as hardware management, memory and security.

The account managing module 152 indicates software to create a temporary account, recording the account on the user account DB 130, and to perform regular updating for the management. For example, when the UI screen of FIG. 9 is displayed on the display 160, and when a user or a manager establishes various options through the UI screen, the account managing module 152 may create a temporary account by combining the device information of the user terminal apparatus 200 according to the established options. Further, the account managing module 152 may generate one or more inactivating conditions based on information inputted through the UI screen of FIG. 7, and may associate the conditions with the temporary account.

The information processing module 153 indicates software (program) to create job performing results information and to provide the information to the account managing module 152 when an image forming job is performed. The information processing module 153 may create the job performing results information by checking the number of printing papers counted in an engine controller, the number of feeding papers, and the job options. The job performing results information may include usage information, usage history, and/or usage status. However, the present general inventive concept is not limited thereto.

Besides, various security modules and various applications modules may be stored in the storage 150. Although FIG. 16 illustrates the storage 150 and the user account DB 130 to be separately provided, the user account DB 130 may be included in the storage 150 according to an embodiment.

The controller 120 may perform various controlling operations by implementing the stored programs in the storage 150. Referring to FIG. 16, the controller 120 includes a RAM 121, a ROM 122, a CPU 123, and a GPU (Graphic Processing Unit) 124. The RAM 121, ROM 122, CPU 123, and GPU 124 may be connected to each other through a bus.

The CPU 123 accesses the storage 150, and performs booting by using the O/S 151 stored in the storage 150.

The ROM 122 stores a set of commands for booting the system thereof. When a turn-on command is inputted and electrical power is provided, the CPU 123 copies the stored O/S in the storage 150 to the RAM 121 according to the stored commands, and boots the system by implementing the O/S.

When the booting completes, the CPU 123 performs various operations by copying various programs stored in the storage 150 to the RAM 121 and implementing the copied programs in the RAM 121. For example, when communication connects between the user terminal apparatus and the device information is received, the CPU 123 may copy the account managing module 152 to the RAM 121 and implement. According to implementing of the account managing module 152, the CPU 123 may create a temporary account based on the device information. The CPU 123 may store the created temporary account in the user account DB 130.

The GPU 124 is configured to generate various screens displayed on the image forming device 100. The GPU 124 may generate various types of UI screens illustrated in FIGS. 7, 8, and 9, and provide the UI screens to the display 160. The display 160 may display the provided UI screens. Although FIG. 16 illustrates that GPU 124 is included in the controller 120, the GPU 124 may be separately provided according to an embodiment.

When an interrupt occurs, a preset time comes, or a present period expires, the CPU 123 may inactivate accounts when the inactivating conditions meet among the stored accounts in the user account DB 130. Further, the CPU 123 may delete an account whose billing completes within the user account DB 130. For example, when the billing information is received through the communicator 110, the CPU 123 may delete an account corresponding to the billing information among the recorded accounts in the user account DB 130.

According to the above embodiment, an image forming job can be conveniently used by using the user terminal apparatus without other host devices regarding image forming devices that can be used or shared by a plurality of people in places such as a library, a public institute, a convenient store, a meeting space, and a school. Since a temporary account is automatically created and managed for each user, account management by a manager is not separately requested, and usage records of a user and security of data can be greatly enhanced. Further, billing receipts can be correctly recognized, and the risk of exposing usage information can be prevented because accounts are deleted after the billing.

The job performing method, the billing method, the account creating method, and the account managing method according to the above embodiment may be coded to be software and stored in non-transitory computer readable recording medium. Such a non-transitory computer readable recording medium may be loaded and used on various devices such as image forming devices, user terminal apparatuses, and billing devices.

For example, program codes performing creating a temporary account regarding the user terminal apparatus when communication with the user terminal apparatus is performed, registering the temporary account on the user account DB, performing the image forming job when an image forming job is requested from the user terminal apparatus while the temporary account is valid, recording job performing results information on the temporary account when the image forming job is performed, and inactivating the temporary account when inactivating conditions of the temporary account are met may be stored in non-transitory computer readable recording medium and loaded on display apparatuses.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a register, a cache memory, a read-only memory (ROM), a random-access memory (RAM), a USB memory, a memory card, a blue-ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming device, comprising:
   a communicator configured to perform communication with an external user terminal apparatus;
   a user account database (DB);
   a controller configured to create a temporary account regarding the external user terminal apparatus and register the account on the user account DB, in response to the communication performed with the external user terminal apparatus; and
   an image former configured to perform an image forming job in response to a request for the image forming job received from the external user terminal apparatus while the temporary account is valid,
   wherein the controller records job performing result information on the temporary account in response to the image forming job, and inactivates the temporary account according to an inactivating condition of the temporary account.

2. The image forming device of claim 1, wherein the controller deletes the temporary account from the user account DB in response to billing regarding the temporary account.

3. The image forming device of claim 2, wherein the controller transmits the job performing result information recorded on the temporary account to the billing device in response to a request for information regarding the temporary account received from a billing device.

4. The image forming device of claim 2, wherein:
   the communicator collects device information regarding the external user terminal apparatus by performing a nearfield wireless communication in response to approaching to the image forming device by the external user terminal apparatus; and
   the controller creates the temporary account by using the device information.

5. The image forming device of claim 4, further comprising:
   a display configured to display a user interface (UI) to establish the temporary account in response to the nearfield wireless communication performed with the external user terminal apparatus,
   wherein the controller establishes the inactivating condition regarding the temporary account according to a user setting inputted from the UI, the UI comprises at least one of a first menu to determine the inactivating condition according to user setting, and a second menu to establish a function provided to the temporary account, and the inactivating condition includes at least one among a valid time period of the temporary account, the number of jobs that can be performed by using the temporary account, and the number of pages that can be printed by using the temporary account.

6. The image forming device of claim 4, wherein the communicator provides source information which provides an application to interoperate with the image forming device to the external user terminal apparatus by performing the nearfield wireless communication, in response to approaching to the image forming device by the external user terminal apparatus.

7. The image forming device of claim 1, wherein the controller informs a user that the job cannot be performed in response to a request for the image forming job received from the external user terminal apparatus while the temporary account is inactivated.

8. A job performing method of an image forming device, comprising:
creating a temporary account regarding an external user terminal apparatus in response to communication with the external user terminal apparatus;
registering the temporary account on a user account database (DB);
performing an image forming job in response to a request for the image forming job received from the external user terminal apparatus while the temporary account is valid;
recording job performing result information on the temporary account in response to the image forming job; and
inactivating the temporary account according to an inactivating condition of the temporary account.

9. The job performing method of claim 8, further comprising:
deleting the temporary account from the user account DB in response to billing regarding the temporary account.

10. The job performing method of claim 9, further comprising:
transmitting the job performing result information recorded on the temporary account to the billing device in response to a request for information regarding the temporary account received from a billing device.

11. The job performing method of claim 9, wherein the creating the temporary account comprises:
collecting device information regarding the external user terminal apparatus by performing a nearfield wireless communication in response to approaching to the image forming device by the user terminal apparatus; and
creating the temporary account by using the device information.

12. The job performing method of claim 11, further comprising:
displaying a user interface (UI) to establish the temporary account in response to the nearfield wireless communication with the external user terminal apparatus; and
establishing the inactivating condition according to an option inputted from the UI,
the UI comprises at least one of a first menu to determine the inactivating condition according to user setting, and a second menu to establish a function provided to the temporary account, and
the inactivating condition includes at least one among a valid time period of the temporary account, the number of jobs that can be performed by using the temporary account, and the number of pages that can be printed by using the temporary account.

13. The job performing method of claim 11, further comprising:
providing source information which provides an application to interoperate with the image forming device to the external user terminal apparatus by performing the nearfield wireless communication, in response to approaching to the image forming device by the user terminal apparatus.

14. The job performing method of claim 8, further comprising:
informing a user that the job cannot be performed in response to a request for the image forming job received from the external user terminal apparatus while the temporary account is inactivated.

15. An image forming device usable with an image forming system, comprising:
a processor unit configured to create and store a temporary account regarding an external user terminal apparatus in response to tagging of the external user terminal apparatus, and to inactivate the temporary account when an inactivating condition of the temporary account is met; and
an image former configured to be controlled by the processor unit and configured to perform an image forming job in response to a request for the image forming job received from the external user terminal apparatus while the temporary account is valid.

16. An image forming system, comprising:
a user terminal apparatus; and
the image forming device of claim 15.

17. The image forming system of claim 16, further comprising:
a billing device configured to receive job performing result information regarding the temporary account from the image forming device in response to tagging of the user terminal apparatus, perform the billing regarding the temporary account based on the job performing results information and preset billing information, and respectively transmit billing information to the image forming device and the user terminal apparatus,
wherein the user terminal apparatus and the image forming device respectively delete the temporary account in response to reception of the billing information.

18. The image forming system of claim 17, wherein:
the user terminal apparatus receives source information to provide an application to interoperate with the image forming device in response to tagging of the image forming device, accesses a source device corresponding to the source information to download, installs and implements the application, and transmits device information of the user terminal apparatus to the image forming device according to implementing of the application; and
the image forming device creates the temporary account by using the device information.

19. The image forming system of claim 16, wherein:
the image forming device displays a user interface (UI) to establish the temporary account in response to tagging of the user terminal apparatus, and establishes the inactivating condition regarding the temporary account according to user setting inputted from the UI, the UI comprises at least one of a first menu to determine the inactivating conditions according to user setting, and a second menu to establish a function provided to the temporary account, and the inactivating conditions comprise a valid time period of the temporary account or the number of jobs that can be performed.

20. A non-transitory computer-readable medium to contain computer-readable codes as a program to execute the method of claim 8.

* * * * *